J. L. HARDEMAN.
Hemp Brake.
No. 17,274.
Patented May 12, 1857.
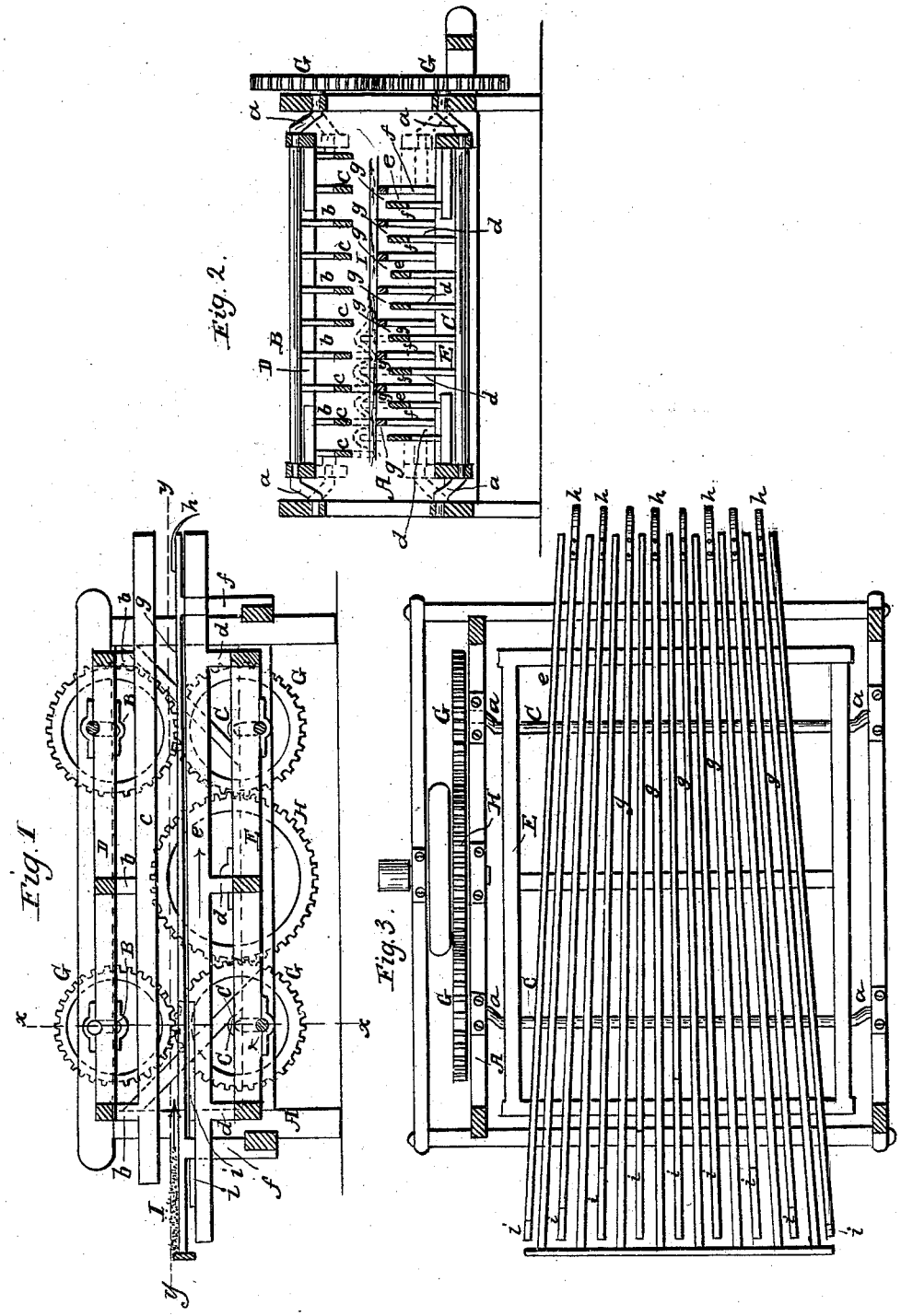

United States Patent Office.

J. L. HARDEMAN, OF ARROW ROCK, MISSOURI.

IMPROVEMENT IN HEMP-BRAKES.

Specification forming part of Letters Patent No. 17,274, dated May 12, 1857.

*To all whom it may concern:*

Be it known that I, J. L. HARDEMAN, of Arrow Rock, in the county of Saline and State of Missouri, have invented certain new and useful Improvements in Machines for Breaking Hemp, and known as "Hemp-Brakes;" and I do hereby declare that the following is a full, clear, and exact description of the same, reference being had to the annexed drawings, making a part of this specification, in which—

Figure 1 is a longitudinal vertical section of my improvement, the plane of section being through the center. Fig. 2 is a transverse vertical section of the same, $x\,x$, Fig. 1, showing the plane of section. Fig. 3 is a horizontal section of the same, $y\,y$, Fig. 1, showing the plane of section.

Similar letters of reference indicate corresponding parts in the several figures.

My invention consists in the combination of a pair of movable platforms, each of which has a curvilinear motion, with a stationary platform, in the manner and for the purposes hereinafter set forth.

To enable those skilled in the art to understand and construct my invention, I will proceed to describe it.

A represents a rectangular framing, which may be constructed of wood or metal, and B B C C represent four shafts, which are placed transversely in said framing, the shafts B B being in the upper and the shafts C C in the lower parts of the framing. These shafts are what may be termed "crank-shafts"—that is, their journals are connected to the main portions of cranks $a$, as shown clearly in Figs. 2 and 3. The shafts B B are placed directly over or in the same plane with the shafts C C.

D represents a rectangular frame, which is attached to the shafts B B within the cranks $a$, as shown clearly in Figs. 2 and 3. The frame D has pendants $b$ attached to it, and to these pendants a slatted platform composed of bars $c$ is secured.

E represents a rectangular frame, which is attached to the two lower shafts, C C. The frame E is precisely similar to the frame D, and has uprights $d$ attached to it, the said uprights $d$ having a slatted platform composed of bars $e$ secured to them. These bars $e$ and the frame E are plainly shown in Fig. 3. The bars $e$ and $c$ on the frames D E are made of a proper width and thickness, and are so placed or attached to their respective frames that the bars of one frame are in line with the spaces between the bars of the other frame, as shown clearly in Fig. 2. The bars in the frames D E are not parallel with each other. Their outer ends are rather nearer together than their inner ends. This is shown clearly in Fig. 3.

To each end of the framing A uprights $f$ are attached, and to the upper ends of these uprights is secured a stationary slatted platform composed of bars $g$. These bars $g$ are not parallel with each other, but are placed similarly to the bars $e\,c$ on the frames D E. The bars $g$ are placed in line with the spaces between the bars $e$ on the frame E, as shown in Figs. 2 and 3. The outer ends of the bars $g$ have curved plates or teeth $h$ attached to them, as shown in Figs. 1 and 3, the plates or teeth $h$ being gradually curved or bent downward.

The journals of the cranks $a$ of the shafts B B C C at one end have each a toothed wheel, G, attached. The wheels G on the upper shafts, B B, gear into the wheels on the lower shafts, C C, and between the two wheels on the lower shafts, C C, a toothed wheel, H, is placed, said wheel gearing into the two lower wheels, and, when rotated, giving motion to the four shafts. The wheels G are so attached to the shafts B B C C that their cranks $a$ will be in opposite positions; or, in other words, the cranks of the upper and lower shafts are so placed relatively with each other that they will pass their centers at the same instant in opposite positions. This will be clearly seen by referring to Fig. 2.

The inner or front ends of the bars $e\,c$ and what may be termed their "face sides" or "edges" have recesses or notches $i$ made in them; or the bars may be described as being diminished in thickness or depth at varying distances or lengths, as shown clearly in Fig. 3.

The operation is as follows: The hemp I is placed transversely on the front end of the bars $g$, as shown in Figs. 1 and 2. Motion is given the driving-wheels H in any proper manner, whereupon the cranks $a$ impart a curvilinear movement to the bars $c\,e$ of the two movable platforms, and the latter are brought simultaneously toward and from each other, the bars *e c*, when nearest each other, fitting between each other, so that the two sets of bars will be in the same plane. As the bars *e c* recede from each other the lower bars, *e*, pass between and below the stationary bars *g*.

It will be seen that the cranks *a* of the shafts B B C C give not only a vertical or up-and-down movement to the bars *e c*, but also a forward movement. The lower bars, *e*, as they pass upward between the stationary bars *g*, raise the hemp I, placed thereon, and the hemp is broken between the two sets of bars *e c*, as shown in red in Fig. 2. As the bars *e c* recede from each other, the hemp is carried forward by the bars *e* and placed farther forward on the bars *g*, the hemp being fed a certain distance forward at each vibration of the bars; and as the bars *e c* are not parallel, but gradually approach each other from their inner to their outer ends, it will be seen that all parts of the hemp—that is, its whole length—will be acted upon and perfectly broken as it passes from the feed to the discharge end of the machine. The curved teeth *h* cause the broken hemp to fall freely from the discharge end of the bars *e*, and prevent it being drawn underneath or catching below the ends of the bars *g*. These teeth may be curved or bent in any form, so that they will pass through and beyond the circle described by the ends of the bars *e*. The recesses or notches *i* at the inner or front ends of the bars *e c* prevent the said bars from acting, in the first instance, upon the entire length of the hemp, but cause the bars to act first at the middle of the hemp, and gradually toward each end, or the bars may first act at the ends and gradually approach the center. The notches or recesses may be made to act in either way. In Fig. 3 the recesses are so arranged that the bars will first act upon the hemp from its ends toward the center. The above machine has been practically tested, and operates rapidly and well.

I do not claim, broadly, the invention of reciprocating slatted platforms for breaking hemp, for I am aware that they are old. An example may be seen in Walker's patent, May 27, 1851. Nor do I claim giving a curvilinear movement to the beds of printing-presses, as seen in T. H. Dodge's patent, November 18, 1851. In this example the printing-beds have a curvilinear movement imparted to them similar to that given to my platforms, and by analogous means. I do not claim this mechanical movement; but, to the best of my knowledge and belief, the combination of a pair of slatted platforms, *c e*, each of which has a curvilinear motion, with an intermediate stationary platform, *g*, as set forth, is a new feature in hemp-brakes, constitutes a new combination, and is productive of useful results. Therefore,

I claim as new in hemp-brakes and desire to secure by Letters Patent—

The employment, in combination with a stationary platform composed of bars *g*, of a pair of curvilinear-moving platforms composed of bars *c e*, as and for the purposes set forth.

J. LOCKE HARDEMAN.

Witnesses:
    JESSE McMAHAN,
    HENRY C. MILLER.